(12) United States Patent
Komaki et al.

(10) Patent No.: US 6,775,838 B2
(45) Date of Patent: Aug. 10, 2004

(54) OPTICAL INFORMATION MEDIUM AND ITS TESTING METHOD

(75) Inventors: Tsuyoshi Komaki, Chuo-ku (JP); Naoki Hayashida, Chuo-ku (JP); Hideki Hirata, Chuo-ku (JP)

(73) Assignee: TDK Corporation, Tokyo (JP)

( * ) Notice: Subject to any disclaimer, the term of this patent is extended or adjusted under 35 U.S.C. 154(b) by 164 days.

(21) Appl. No.: 09/945,811

(22) Filed: Sep. 5, 2001

(65) Prior Publication Data

US 2002/0054565 A1 May 9, 2002

(30) Foreign Application Priority Data

Sep. 5, 2000 (JP) .................................. 2000-269242
Feb. 22, 2001 (JP) .................................. 2001-046778

(51) Int. Cl.$^7$ ................................................ G11B 3/70
(52) U.S. Cl. ................................................... 720/718
(58) Field of Search ........................... 369/283; 428/213; 430/270.13

(56) References Cited

U.S. PATENT DOCUMENTS

| | | | | |
|---|---|---|---|---|
| 5,098,761 A | * | 3/1992 | Watanabe et al. | ........... 428/64.5 |
| 5,292,568 A | | 3/1994 | Tezuka et al. | |
| 6,319,582 B1 | * | 11/2001 | Tominaga et al. | ......... 428/64.1 |
| 6,333,913 B1 | * | 12/2001 | Yoshinari et al. | ........... 369/283 |
| 6,507,559 B1 | * | 1/2003 | Iwaki | ..................... 369/275.5 |

FOREIGN PATENT DOCUMENTS

| | | |
|---|---|---|
| EP | 0 390 413 | 10/1990 |
| EP | 0 419 295 | 3/1991 |
| EP | 0 509 671 | 10/1992 |
| JP | 8-194968 | 7/1996 |
| JP | 10-289489 | 10/1998 |

* cited by examiner

Primary Examiner—William Korzuch
Assistant Examiner—Mark Blouin
(74) Attorney, Agent, or Firm—Oblon, Spivak, McClelland, Maier & Neustadt, P.C.

(57) ABSTRACT

An optical information medium is provided. The medium comprises a supporting substrate, an information recording layer thereon, and a light-transmitting layer thereon and a recording or reading laser beam enters the recording layer through the light-transmitting layer, and in such medium, recording/reading characteristics are improved when the beam spot of a laser beam has a small diameter and the linear velocity is high with the function of the light-transmitting layer to protect the information recording layer maintained at a sufficient level. Also provided is a medium wherein storage stability is improved. In the optical information medium comprising a supporting substrate, an information recording layer thereon, and a light-transmitting layer on the information recording layer wherein a recording or reading laser beam enters the information recording layer through the light-transmitting layer, the light-transmitting includes at least one resin layer, and has a tensile yield stress of 20 to 100 MPa and tensile strain at yield of 0.1 to 15%.

5 Claims, 1 Drawing Sheet

FIG. 1

OPTICAL INFORMATION MEDIUM AND ITS TESTING METHOD

BACKGROUND OF THE INVENTION

This invention relates to optical information medium such as read-only optical disks and optical recording disks, and a method for testing storage stability of an optical information medium having a resin layer.

To record and store a vast quantity of information as typified by moving image information, advanced optical disks such as read-only optical disks and optical recording disks are required to increase their recording density for increasing the capacity. To meet such a demand, engineers have been engaged in the research and development works targeting a higher recording density.

One such approach relating to digital versatile disks (DVD) is to shorten the wavelength of a recording/reading laser beam and increase the numerical aperture (NA) of a recording/reading optical system objective lens, thereby reducing the spot diameter of the recording/reading laser beam. As compared with CD, DVD is successful in achieving a recording capacity of 6 to 8 folds (typically 4.7 GB/side) by changing the recording/reading wavelength from 780 nm to 650 nm and the NA from 0.45 to 0.6.

For long-term recording of moving images of quality, an attempt was recently made to achieve a recording capacity of at least 4 folds of that of DVD, i.e., at least 20 GB/side, by reducing the recording/reading wavelength to about 400 nm and increasing the NA of the objective lens to about 0.85.

Increasing the NA, however, leads to a reduced tilt margin. The tilt margin is a permissible tilt of an optical recording medium relative to an optical system, which depends on the NA. The tilt margin is in proportion to $$\lambda/(t \cdot NA^3)$$

wherein $\lambda$ denotes the wavelength of recording/reading beam and "t" denotes the thickness of a transparent substrate the recording/reading beam enters. If the optical disk is inclined or tilted relative to the laser beam, a wavefront aberration (or coma) occurs. The coefficient of wavefront aberration is represented by $$(\tfrac{1}{2}) \cdot t \cdot \{n^2 \cdot \sin\theta \cdot \cos\theta\} \cdot NA^3/(n^2 - \sin^2\theta)^{-5/2}$$

wherein n denotes the refractive index of the substrate and $\theta$ is a tilt angle. It is appreciated from these formulae that the tilt margin may be increased and the occurrence of comatic aberration be suppressed by reducing the thickness "t" of the substrate. In fact, the DVD design is such that a tilt margin is secured by reducing the thickness of the substrate to about one half (about 0.6 mm) of the thickness (about 1.2 mm) of the CD substrate.

To record moving images of better quality for a longer period of time, there has been proposed a structure allowing for use of a thinner substrate. In this structure, a substrate of an ordinary thickness is used as a supporting substrate for maintaining rigidity, pits or a recording layer is formed on the surface of the supporting substrate, and a light-transmitting layer of about 100 μm thick is formed thereon as a thin substrate. Recording/reading beam reaches the pits or recording layer through the light-transmitting layer. This structure can achieve a higher recording density due to a higher NA because the substrate can be made extremely thin as compared with the prior art. One typical optical disk having such structure is disclosed in JP-A 289489/1998. The disk is described therein as having a light-transmitting layer of a photo-curable resin.

When the light-transmitting layer is formed of photo-curable resins such as UV-curable resins, however, the optical disk can deflect due to shrinkage upon curing. Deflection can also occur when the optical disk is stored in a hot humid environment. Once the optical disk deflects, loading of the disk in the optical disk drive may become difficult, and once the optical disk is deflected with twisting, axial runout of the optical disk increases and frequent errors occur upon reading, and excessive deflection can cause the optical disk to be unreadable. In particular, when the medium is recorded/read using a laser beam with reduced beam spot diameter and at a high linear velocity, focus servo becomes considerably unstable due to the increase in axial runout acceleration.

By reducing the recording/reading wavelength, increasing the NA of the objective lens to reduce the beam spot diameter, and increasing the linear velocity during recording and reading, there can be achieved a significant improvement in data transfer rate. Even a data transfer rate of 100 Mbps or higher is possible. With the start of the satellite digital broadcasting system at the end of 2000, image information of high quality is now delivered to home. A remarkable improvement in data transfer rate is thus demanded for recording such image information. However, the focusing servo stability must be improved before the data transfer rate can be increased.

The inventors of the present invention have also found through their investigation that, when a surface layer of high hardness is formed on the light-transmitting layer to improve the scratch resistance, the medium undergoes increased deflection with twisting during hot humid storage to invite considerable increase in the axial runout as well as cracks and fractures of the surface layer. It was also found that such cracks and fractures are more significant when the medium is subjected to a thermal shock test wherein the medium is subjected to alternate high temperature storage and low temperature storage compared to static storage wherein the medium is stored under high temperature or high humid conditions.

An object of the invention is to provide an optical information medium comprising a supporting substrate, an information recording layer thereon, and a light-transmitting layer thereon wherein a recording or reading laser beam enters the medium through the light-transmitting layer, in which recording/reading characteristics are improved even when the beam spot of a laser beam has a small diameter and the linear velocity is high without compromising the function of the light-transmitting layer of protecting the information recording layer. Another object is to improve storage stability of such medium.

SUMMARY OF THE INVENTION

Such objects are attained by the present invention as described in (1) to (8), below.

(1) An optical information medium comprising a supporting substrate, an information recording layer thereon, and a light-transmitting layer on the information recording layer, wherein a recording or reading laser beam enters the medium through the light-transmitting layer, wherein said light-transmitting layer includes at least one resin layer, and said light-transmitting layer has a tensile yield stress of 20 to 100 MPa and a tensile strain at yield of 0.1 to 15%.

(2) An optical information medium according the above (1) wherein said light-transmitting layer comprises at least one resin-containing inner layer and one surface layer which is harder than the inner layer by at least 1 unit in pencil hardness, and said surface layer constitutes a surface of the medium.

(3) An optical information medium according to the above (2) wherein said inner layer comprises a resin sheet or a coating of a resin containing a radiation-curable resin.

(4) An optical information medium according any one of the above (1) to (3) wherein said light-transmitting layer has a thickness of 30 to 200 μm.

(5) An optical information medium according to any one of the above (1) to (4) wherein said light-transmitting layer includes at least two annular resin layers and at least one of said resin layers is a resin coating, and said resin coating has an inner diameter larger than that of its adjacent resin layer on the side of the supporting substrate.

(6) A method for testing storage stability of an optical information medium comprising a substrate, an information recording layer thereon, and at least one resin layer on the information recording layer, wherein the method comprises the steps of exposing the optical information medium to at least thirty cycles each comprising a high temperature environment and a low temperature environment with the temperature difference of at least 70° C., and thereafter inspecting mechanical precision of the optical information medium and cracks and peeling of said resin layer.

(7) A method for testing an optical information medium according to the above (6) wherein the medium has at lest two resin layers.

(8) A method for testing an optical information medium according to the above (6) or (7) adapted for use with the optical information medium of any one of the above (1) to (5).

DETAILED DESCRIPTION OF THE INVENTION

In an optical information medium in which information is read through a light-transmitting layer of about 100 μm thick, the present invention controls the tensile yield stress and tensile strain at yield of the light-transmitting layer to specific ranges, respectively.

This enables reduction in the deflection and the axial runout of the medium, and reduction in the increase of the axial runout when the medium is stored under hot humid environment or when the medium is subjected to thermal cycles of alternate high temperature storage and low temperature storage. Reduced axial runout results in the reduced axial runout acceleration, and consequently, reduced focus servo error upon increase in the linear velocity which enables high transfer rate.

Such control of the tensile yield stress and tensile strain at yield of the light-transmitting layer also suppresses cracks in the surface layer when the light-transmitting layer comprises a laminate of a resin layer and a surface layer with a higher hardness and when the medium is stored under hot humid environment or when the medium is subjected to thermal cycles of alternate high temperature storage and low temperature storage.

It is noted that no direct correlation exists between the deflection and the axial runout of the medium. A medium having a large deflection quantity tends to have a large axial runout quantity. However, a disk-shaped medium which has deflected like an umbrella, for example, experiences little increase of axial runout despite decrease in the mechanical precision of the disk. On the other hand, a disk-shaped medium which has deflected with some twisting will experience considerable axial runout even when the deflection measured were small. It is understood that for a resin layer, no direct correlation exists between the tensile yield stress and the tensile strain at yield.

Figure 1:
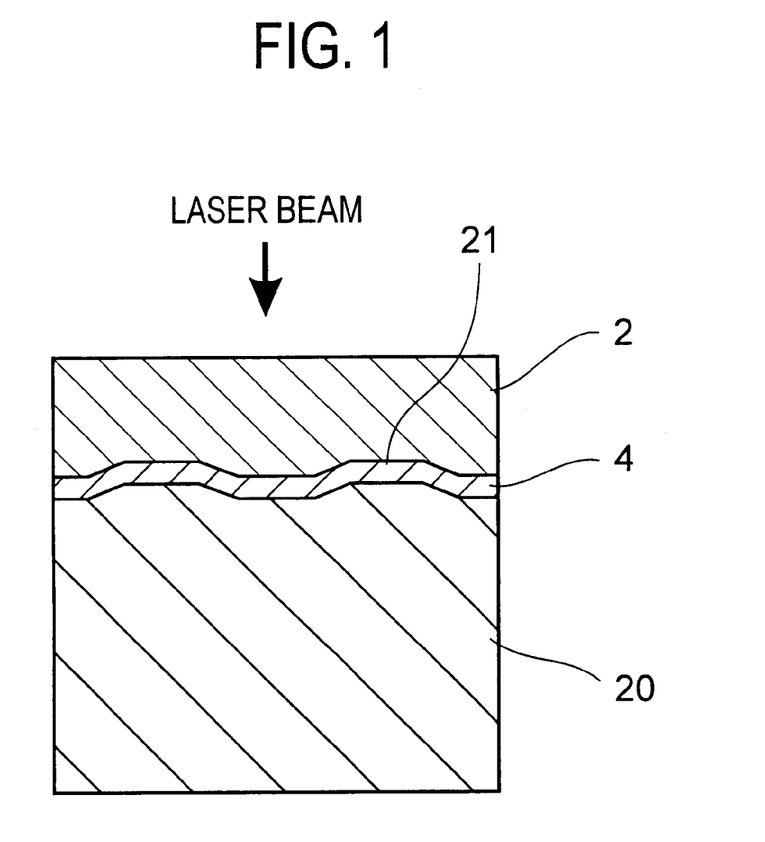
FIG. 1 is a partial cross-sectional view of the optical information medium according to an embodiment of the present invention.

Referring to FIG. 1, there is illustrated one embodiment of the optical information medium of the present invention. This optical information medium is a recording medium including a supporting substrate 20, an information recording layer in the form of a recording layer 4 on the supporting substrate 20, and a light-transmitting layer 2 on the recording layer 4. A laser beam for recording or reading is passed to the recording layer 4 through the light-transmitting layer 2.

The invention is applicable to any type of recording layer. Specifically, the invention is applicable to phase change recording media, pit formation type recording media, and magneto-optical recording media, for example. In general, additional layers such as a dielectric layer and a reflective layer are provided on at least one side of the recording layer for the purposes of protecting the recording layer and achieving optical effects, although they are omitted in FIG. 1. The invention is not limited to the recordable type as in the illustrated embodiment, and may also be applicable to the read-only type. In the latter case, the reflective layer which is formed over the pit train that had been integrally formed with the supporting substrate 20 constitutes the information recording layer.

Next, the components of the medium of the present invention are described in detail.

The supporting substrate 20 is provided to maintain rigidity for the medium. The supporting substrate 20 generally has a thickness of 0.2 to 1.2 mm, preferably 0.4 to 1.2 mm and may be either transparent or opaque. The supporting substrate 20 is usually constructed of a resin like conventional optical recording media although glass may also be used for the substrate. Grooves or guide channels 21, which are generally formed in optical recording media, are obtained by forming grooves in the supporting substrate 20 and transferring the grooves to the layers deposited thereon. The grooves 21 are (depressed) regions located closer to the incident side of recording/reading laser beam, while strip-like raised regions interposed between adjacent grooves serve as lands.

The light-transmitting layer 2 has a sufficient transparency for laser beam to pass therethrough. The light-transmitting layer preferably has a thickness in the range of from 30 μm to 200 μm, more preferably from more than 50 μm to 200 μm and most preferably from 70 μm to 150 μm. If the light-transmitting layer is thinner than the range, dust depositing thereon can have detrimental optical effects. Under the situation that the distance between the optical pickup and the medium is to be reduced as a result of increase in NA, so that the optical pickup can frequently contact the medium surface, a thinner light-transmitting layer fails to provide a sufficient protective effect against contact with the optical pickup. If the light-transmitting layer is too thick, it may be difficult to achieve a high recording density by an increase of NA. It is noted that a thick light-transmitting layer of, for example, more than 200 μm thick can have a greater deflection and greater axial runout, and such axial runout may be accelerated in the storage under hot humid conditions or under repeated cycles of high temperature storage and low temperature storage. In view of the situation as described above, the present invention is particularly effective when the light-transmitting layer has a thickness within such range.

The light-transmitting layer 2 has a tensile yield stress of up to 100 MPa, preferably up to 80 MPa, and a tensile strain at yield of at least 0.1%, preferably at least 1%.

If the tensile yield stress is too high, the medium may suffer from increased deflection to detract from the mechanical precision, and such decrease in the mechanical precision is greatly accelerated when the medium is stored under hot humid conditions or when the medium is subjected to alternate cycles of high temperature storage and low temperature storage.

If the tensile strain at yield is too low, the medium may suffer from increased axial runout, and such increase in the axial runout greatly increases especially when the medium is stored under severe conditions such as hot humid conditions or when the medium is subjected to alternate cycles of high temperature storage and low temperature storage. An excessively low tensile strain at yield also tends to result in cracks and fractures of the light-transmitting layer.

On the other hand, if the tensile yield stress of the light-transmitting layer is too low, the function inherent to the light-transmitting layer, namely, the function of protecting the information recording layer may become insufficient. When a light-transmitting layer is provided and the light-transmitting layer is of the structure comprising a resin-containing inner layer and a surface layer of a higher hardness and superior scratch resistance formed on the inner layer, an excessively low tensile yield stress of the light-transmitting layer may invite cracks in the surface layer when the medium is stored under hot humid conditions or when the medium is subjected to alternate cycles of high temperature storage and low temperature storage. In view of such situation, the tensile yield stress is preferably at least 20 MPa, and more preferably at least 25 MPa.

If the tensile strain at yield of the light-transmitting layer is too high, the light-transmitting layer will be too soft and the layer will suffer from insufficient strength. When the light-transmitting layer has an excessively high tensile strain at yield in the case when the surface layer of high hardness is provided, cracks will be generated in the surface layer during storage under hot humid conditions or during alternate cycles of high temperature storage and low temperature storage. In view of such situation, the tensile strain at yield is preferably up to 15%, and more preferably up to 10%.

It is noted that the tensile yield stress and tensile strain at yield used herein is as prescribed in JIS K-7127 (1989). Upon measurement, parameters are set to:

specimen length: 60 mm, specimen width: 10 mm, distance between two gage marks: 40±1 mm, distance between grips: 44±1 mm, and separation rate: 30 mm/min, and the remaining measurement conditions are as prescribed in JIS K-7127 (1989). The described parameters differ from those of JIS K-7127 (1989) because the size of the medium (usually a diameter of about 12 cm for an optical disk) is taken into account so that measurement may be made on the light-transmitting layer peeled from the medium. When the light-transmitting layer does not exhibit clear yield point, tensile proof stress may be used instead of the yield point. Permanent strain should be defined to determine the tensile proof stress, and in the present invention, 0.5% is used for the permanent strain. Namely, tensile stress at 0.5% strain is used instead of the tensile proof stress.

The adjustment of the tensile yield stress and tensile strain at yield in the above-defined ranges makes it possible to reduce the deflection and axial runout of the medium immediately after manufacture, and to reduce the increase of the axial runout during storage in a hot humid environment and during alternate cycles of high temperature storage and low temperature storage. Even at a high linear velocity at which the axial runout acceleration becomes so high that focusing servo errors may frequently occur, for example, a linear velocity of at least 8 m/s, especially 10 to 35 m/s, the occurrence of focusing servo errors can be fully suppressed. In the case when a surface layer of higher hardness is provided in the light-transmitting layer, generation of cracks in the surface layer is also suppressed.

The advantages of the invention becomes more outstanding when recording or reading is performed by a system including an objective lens having a numerical aperture NA and emitting a recording or reading beam having a wavelength of $\lambda$ wherein $\lambda/NA \leq 680$ nm. That is, the medium of the invention is more effective when a recording/reading beam having a relatively short wavelength is passed through an objective lens having a large NA. It is noted that the medium is generally acceptable if satisfactory recording/reading characteristics are available in the range of 400 nm $\leq \lambda/NA$.

The present invention is characterized in that the light-transmitting layer has a tensile yield stress and a tensile strain at yield in the above-defined ranges, whereby the above-described benefits are achievable. Therefore, the constitution of the resin of which the light-transmitting layer is formed and the method of forming the light-transmitting layer are not critical. Included are a method of applying a resin or a composition which will cure to form a resin, followed by optional curing, and a method of joining a previously formed resin sheet with a UV-curable adhesive or pressure-sensitive adhesive. In order to obtain a light-transmitting layer having a low birefringence, it is preferred that the light-transmitting layer be formed by applying a radiation-curable resin such as UV-curable resin by a spin coating technique, and exposing the coating to radiation such as UV radiation for curing. On the other hand, when the light-transmitting layer is constituted from the inner layer and the surface layer as will be described below and generation of cracks in the surface layer is to be avoided, use of a resin sheet for the inner layer is preferable in view of the ease of attaining a sufficient tensile yield stress.

The radiation-curable resin composition used herein generally contains at least one of mono- or polyfunctional monomers, oligomers and polymers, and also, a polymerization initiator, photopolymerization initiator aid, polymerization inhibitor and other additives. Such a composition may be prepared by adequately selecting and combining the components, for example, from the compositions for protective coat on high-density optical disks described in the above-referred JP-A 194968/1996. The preferred composition used herein is the one comprising at least a linear difunctional oligomer having functional groups at opposite ends and a monofunctional monomer. If the content or molecular weight of the difunctional oligomer is too low, then the tensile strain at yield after curing becomes small. As the ratio of the monofunctional monomer to the difunctional oligomer increases, the tensile yield stress can be reduced without a substantial loss of the tensile strain at yield after curing. Also, the addition of the monofunctional monomer improves the adhesion between the light-transmitting layer and the surface on which it is formed. It is noted that if the content of the monofunctional monomer is too high, the tensile strain at yield after curing becomes small and tensile yield stress becomes excessively low. Therefore, the content and molecular weight of the difunctional oligomer and the content of the monofunctional monomer may be selected as appropriate depending on the physical properties of the light-transmitting layer required in the present invention. It is understood that such a composition may be selected from commercially available ones.

The preferred radiation-curable resin composition used herein has a relatively high viscosity, typically in the range of about 1,000 to 30,000 centipoise at 25° C.

The present invention is particularly effective for a medium of the structure wherein a surface layer is formed on a resin-containing inner layer, and wherein the surface layer has higher hardness and scratch resistance compared to the inner layer and the surface layer constitutes one surface of the medium. The surface layer may preferably have a hardness which is higher then that of the inner layer by at least 1 unit in pencil hardness as measured by a pencil scratch tester or similar instrument defined in JIS K5401. To be more specific, the surface layer may preferably have a hardness at 25° C. of HB to 4H, and more preferably F to 4H. An excessively low pencil hardness results in an insufficient scratch resistance while an excessively high pencil hardness results in an insufficient softness and susceptibility to cracks.

When such surface layer is provided on the medium, cracks are likely to generate in the surface layer if the light-transmitting layer as a whole fails to exhibit the tensile yield stress and the tensile strain at yield within the scope of the present invention.

When the light-transmitting layer has a two-layer structure of surface and inner layers, the surface layer preferably has a thickness of 0.1 to 10 μm, more preferably 0.3 to 5 μm. If the surface layer is too thin, the protective effect may become insufficient. Inversely, if the surface layer is too thick, it may become difficult to control the physical properties of the entire light-transmitting layer so as to fall within the range specified herein, and cracks are likely to be generated in the surface layer.

The tensile yield stress and the tensile strain at yield defined in the present invention are the values for the entire light-transmitting layer also for the case of the medium wherein the light-transmitting layer has a multi-layer structure. The surface layer, however, is thinner than the inner layer, and the contribution of the surface layer in terms of physical properties to the entire light-transmitting layer is relatively small.

The inner layer may be a layer formed by curing a coating of a radiation-curable composition or a layer formed by laying a previously formed resin sheet. When a resin sheet is used, the inner layer usually has a multi-layer structure including an adhesive layer for adhering the resin sheet, and the adhesive layer may preferably comprise a radiation-curable resin or a pressure sensitive adhesive. The adhesive layer comprising a radiation-curable resin may preferably have a thickness of 0.5 to 5 μm and more preferably 1 to 3 μm. An excessively thin adhesive layer is difficult to form to a uniform thickness, and the adhesive layer of inconsistent thickness will be insufficient in adhesive strength. When the adhesive layer is too thick, it will be difficult to control the physical properties of the light-transmitting layer as a whole to the range required in the present invention. The adhesive layer comprising a pressure sensitive adhesive is free from distortion caused by contraction since it requires no curing step, and the medium is less likely to be deflected and the resin sheet is less likely to be distorted. The pressure sensitive adhesive maybe, for example, an acrylic resin, a silicone resin, or a rubber-based material. The adhesive layer comprising a pressure sensitive adhesive may be formed by any method, and preferably, by coating a pressure sensitive adhesive on a resin sheet. It is also possible to coat opposite sides of a transparent film substrate with a pressure sensitive adhesive and use the resulting pressure sensitive sheet for the adhesive layer. The adhesive layer comprising a pressure sensitive adhesive can be formed to any adequate thickness so that the adhesive layer may have a uniform thickness and sufficient adhesive strength, and preferably, to a thickness of 5 to 70 μm, and more preferably to 10 to 50 μm. When the adhesive layer is too thin, the layer will suffer from insufficient adhesive strength and the yield after the adhesion will be reduced. On the other hand, when the adhesive layer is too thick, the resin layer will be required to have a reduced thickness, and it will be difficult to control the physical properties of the light-transmitting layer as a whole to the range required in the present invention. The resin sheet may be formed from a thermoplastic resin such as a polycarbonate, a polyarylate, or a cycloolefin polymer.

It should be noted an inner layer comprising a radiation-curable resin may also have a multi-layer structure.

The material used to constitute the surface layer is not limited as long as its has sufficient scratch resistance. The surface layer, however, is preferably formed by curing a radiation-curable composition, or polysilazane and/or a material containing silica derived from a polysilazane.

The radiation-curable composition used for the surface layer may preferably have a relatively high content of a polyfunctional oligomer and/or polyfunctional monomer so that the surface layer may have a high hardness. When the composition has a relatively high monofunctional monomer, the surface layer will enjoy an improved adhesion with the inner layer.

The surface layer containing a polysilazane and/or a silica derived from a polysilazane has sufficiently high hardness, and hence, excellent abrasion resistance. Such surface layer may be formed by coating a polysilazane solution on the inner layer and curing the coating at room temperature or at an elevated temperature. A polysilazane is known to undergo hydrolysis when it is heated in atmosphere through reaction with the moisture in the air, forming a compact silica of extremely high purity. When the polysilazane solution has a metal catalyst preliminarily added thereto, the reaction proceeds at a sufficient level when the reaction system is heated to a temperature around 100° C. and conversion into high purity silica is thereby accomplished.

The polysilazane of various types containing Si—N—Si bond may be used in the present invention. The polysilazane used, however, is typically a cyclic inorganic polysilazane or a chain inorganic polysilazane having the structure of (—Si(H)$_2$—NH—)$_n$ wherein n is 100 to 50,000; a mixture thereof; a polyorganohydrosilazane wherein the hydrogen atoms bonding to the silicon atom in the inorganic polysilazane is partly or totally substituted with an organic group; a polysiloxazane wherein oxygen is present in the molecule; a polymetalosilazane which has been produced by reacting a metal alkoxide; a polyborosilazane which has been produced by reacting an organoboron compound; or the like. An exemplary commercially available polysilazane solution is N-L110 manufactured by Tonen K. K.

The solvents which may be used in the preparation of the polysilazane solution include aromatic hydrocarbon solvents such as benzene, toluene, and xylene, ether, tetrahydrofurane, methylene chloride and carbon tetrachloride. Most of such organic solvents, however, are invasive to the thermoplastic resin such as polycarbonate which is used for the light-transmitting layer of an optical information medium as being suitable, and a careful selection is required for the dilution solvent when the surface layer is formed by directly coating a polysilazane solution on the surface of such thermoplastic resin. An exemplary organic solvent which is adequate as a dilution solvent of a polysilazane and which is not invasive to polycarbonate is an ether solvent such as dibutylether. However, a polysilazane solvent containing a resin-invasive organic solvent may be used with no trouble if an adequate intermediate layer is provided, namely, when an intermediate layer comprising a radiation-curable resin such as an acrylic UV-curable resin is formed on the inner layer comprising a sheet of a thermoplastic resin such as polycarbonate, and the polysilazane solution is coated and cured on the surface of such an intermediate layer.

If necessary, the intermediate layer may be surface-modified by treating its surface with a high energy beam such as plasma, corona discharge, or UV. Alternatively, the dose of the radiation such as UV may be adequately controlled to terminate the polymerization of the resin at an appropriate extent, and the polymerization may be completed by resuming the irradiation of the radiation after coating the polysilazane solution on the surface of the intermediate layer. The treatments as described above are both effective in improving the adhesion between the underlying intermediate layer and the cured film of the polysilazane, and hence, in maintaining the surface hardness of the polysilazane film at a favorable level. By the way, the material used for the intermediate layer is not limited to the organic compound, and various materials may be employed as desired. For example, the intermediate layer may comprise an inorganic thin film of $SiO_2$ or the like formed by sputtering, or a film of a UV-curable resin having colloidal silica dispersed therein.

The polysilazane solution may be coated by any conventional coating method such as gravure coating, dip coating, spray coating, and spin coating.

The thus formed polysilazane cured film contains compact, high-purity silica as its main component, and an extremely high hardness is thereby realized in such film. In addition, the polysilazane cured film exhibits an extremely high adhesion with the surface of the inner layer (the surface of a resin cured layer, a resin sheet, or an intermediate layer) since the hydrogen atom bonding to the silicon atom or the nitrogen atom of the polysilazane molecule functions as an active hydrogen. In the cured form, the polysilazane may partly remain in the form of the polysilazane without being converted to the silica.

Such intermediate layer is not particularly limited for its thickness. The intermediate layer, however, may preferably have a thickness of about 50 to 2000 nm.

The thus formed polysilazane cured film realizes an extremely high abrasion resistance by itself. The polysilazane cured film, however, may be optionally combined with an outermost layer formed on its surface which has a composition different from the cured polysilazane. To be more specific, a lubricating layer may be formed on the surface of the polysilazane cured film to provide the surface with an improved abrasion resistance as well as collision resistance to the pickup, or alternatively, an water- and oil-repellent layer may be formed to protect the surface from smudges and for ease of wiping off the smudges that has deposited on the surface.

The lubricating layer may preferably have a coefficient of dynamic friction as measured in accordance with JIS K7125-1987 of up to 0.4, and in particular, up to 0.3. The coefficient of dynamic friction is not limited for its lower limit. The lower limit, however, is typically about 0.03. The water repellency and the oil-repellency may be directly represented by critical surface tension ($\gamma_c$/mNm$^{-1}$) which is an index for the surface free energy of the substance. The critical surface tension can be calculated from the measurements of the contact angle, and to be more specific, by measuring several saturated hydrocarbon liquids (surface tension: ($y_1$/mNm$^{-1}$) each having known surface tension for their contact angle (θ/rad) on a smooth surface of the substance; and plotting cos θ in relation to $\gamma_l$ and extrapolating to cos θ=1 to find the corresponding value $\gamma_c$. When a particular substance should repel a liquid, the $\gamma_c$ of the substance should be lower than the surface tension $\gamma_1$ of the liquid.

The lubricating layer or the water- and oil-repellent layer may be formed from a material commonly used in the art, for example, a higher fatty acid ester such as butyl stearate or butyl myristate, or a derivative thereof; a silicone oil such as dimethylsiloxane derivative, or a modified product thereof; or a fluorohydrocarbon lubricant or a derivative thereof. It is also possible to use a fluorohydrocarbon silane coupling agent since the polysilazane cured film has the polysilazene and/or the silica derived from the polysilazane exposed on its surface. The fluorohydrocarbon silane coupling agent typically has a structrure wherein a fluorohydrocarbon chain is bonded to hydrolyzable silyl group, and since a strong chemical bond is formed through hydrolysis between the silyl group and the polysilazane surface, the film formed on the surface will be provided with a high durability. In the present invention, an adequate material may be selected from the foregoing, and a material provided with both the lubricity and the water- and oil-repellency may also be selected. The materials provided with lubricity and/or the water- and oil-repellency are disclosed in JP-A 213444/1999 and JP-A 187663/1994.

The lubricating layer or the water- and oil-repellent layer may preferably have a thickness of at least 1 nm and the layer is preferably up to 500 nm thick, and most preferably up to 100 nm thick. When the layer is too thick, the layer will fail to exert its full function. An excessively thick layer will reduce the effects of forming the surface layer of high hardness and such thick layer may adversely affect the light transmittance.

In the embodiment wherein the light-transmitting layer has a multi-layer structure formed of layers each comprising a radiation-curable resin, it is customary that a lower layer-forming composition is applied and cured before an upper layer-forming composition is applied and cured. To improve the adhesion between lower and upper layers, a procedure of laying the upper layer on the lower layer which has been semi-cured, and completely curing all the layers at last may be employed.

When a disk-shaped medium has a light-transmitting layer comprising two or more annular resin layers, for example, as in the case of the inner layer and the surface layer as described above, and the resin layer which is formed afterward is a resin coating, and in particular, a resin coating formed by spin coating, the resin layer formed afterward may preferably have an inner diameter which is larger than that of the adjacent resin layer on the side of the supporting layer (i.e., the resin layer formed beforehand). For example, in the case of a light-transmitting layer having a bi-layer structure comprising the inner layer and the surface layer, the surface layer is formed by spin coating after the formation of the inner layer comprising a resin coating or a resin sheet. In such a case, if the starting position of the coating (the position to which the coating solution is fed) is on the interior side of the inner edge of the inner layer (i.e. on the interior side in the medium), the surface layer is likely to suffer from inconsistent coating since the spreading of the coating solution is hindered by the step at the inner edge of the inner layer. Such inconsistency in the coating invites focus servo error. In contrast, when the starting position of the coating is on the exterior side of the inner edge of the inner layer (i.e. on the exterior side in the medium), the coating inconsistency as described above can be avoided, and the resulting surface layer will have an inner diameter larger than that of the inner layer.

In view of preventing the coating inconsistency, it is preferable that the inner diameter of the resin coating is larger than that of the resin layer formed beforehand by 0.5 mm, and more preferably by 1 mm. In addition, the inner edge of the resin coating is not to be located above the recording/reading area of the medium so as to prevent the recording properties of the medium from being adversely affected by the presence of the edge. In the embodiment wherein the resin coating is the surface layer, the resin coating should be formed to completely cover the recording/reading area of the medium so that the light-transmitting layer is protected from scratches in the area above the recording/reading area.

Next, the test method which is well adapted for use in evaluating the storage stability of the optical information medium of the present invention is described.

In this test, an optical information medium comprising a substrate, an information recording layer thereon, and at least one resin layer on the information recording layer is alternately exposed to a high temperature environment and a low temperature environment with the temperature difference of at least 70° C., and preferably 80° C., and thereafter, inspected for mechanical precision of the optical information medium such as deflection of the medium as well as cracks and peeling of the resin layer. In other words, this test is a thermal shock test, and the test would be of no use as an accelerated test if the temperature difference were insufficient. However, it is preferable that the temperature difference does not exceed 110° C. since an excessively high temperature would be required for the high temperature conditions and an excessively low temperature would be required for the low temperature conditions and the test environment will be too segregated from the conditions under which the products are actually used. When the operation of alternately exposing the medium to the high temperature conditions and the low temperature conditions is counted as one cycle, this cycle is preferably repeated in the test for at least 30 times, and more preferably, for at least 50 times. The test would be of no use when the number of cycles is too small while storage stability in actual use can not be evaluated when the number of cycles is increased to an extreme. The number of cycles is preferably up to 500.

The temperature used for the high temperature conditions is preferably in the range of 60 to 80° C., and more preferably 65 to 75° C., and the temperature used for the low temperature conditions is preferably −30 to −10° C., and more preferably −25 to −15° C. The storage time in the high temperature conditions and the low temperature conditions is preferably selected from the range of 20 to 60 minutes. When the storage time is too short, the medium may not reach environmental temperature. When the storage time is too long, a prolonged test time may be required with no substantial improvement in the test precision.

In the thermal shock test, the surface of the medium is preferably kept vertical by inserting a rod in the center hole of a disk-shaped medium and maintaining the rod in horizontal position. It is usual that a plurality of mediums are tested at once, and in such case, the mediums are spaced apart at a sufficient distance (preferably at a distance of at least 10 mm) to thereby prevent stacking of the mediums. Stacking of the mediums by displacement of the medium along the rod may be prevented, for example, by providing a notch on the rod at the position where the medium is to be located, or reducing the diameter of the rod at such position.

The thermal shock test as described above is particularly suitable for evaluating the storage stability of a medium having two or more layers each having different physical properties as in the case of the surface layer and the inner layer as described above. This thermal shock test is capable of conducing a severer evaluation for the occurrence of cracks and peeling of the light-transmitting layer compared to a static storage test wherein the medium is maintained under high temperature, high humidity conditions.

EXAMPLES

Example 1

A sample of optical recording disk was produced by the procedure as described below.

On the grooved surface of a grooved disk-shaped supporting substrates (polycarbonate, diameter 120 mm, thickness 1.2 mm), a reflective layer of $Al_{98}Pd_1Cu_1$ (atomic ratio) was formed by sputtering. The grooves had a depth of $\lambda/6$ as expressed by optical path length at the wavelength $\lambda$ of 405 nm. In the land-groove recording system, the recording track pitch was 0.3 $\mu$m.

On the surface of the reflective layer, a second dielectric layer of 20 nm thick was formed by sputtering an $Al_2O_3$ target.

Next, on the surface of the second dielectric layer, a recording layer of 12 nm thick was formed by sputtering an alloy target of phase change material. The recording layer had the composition of $Sb_{74}Te_{18}$ ($Ge_7In_1$) in atomic ratio.

Next, on the surface of the recording layer, a first dielectric layer of 130 nm thick was formed by sputtering a target of 80 mol % ZnS-20 mol % $SiO_2$.

Next, on the surface of the first dielectric layer, an inner layer of 97 $\mu$m thick was formed by spin coating a UV-curable resin (viscosity 8,400 centipoise at 25° C.) and exposing the coating to UV radiation. This UV-curable resin contains an epoxyacrylate oligomer (bifunctional oligomer), a polyfunctional monomer, a monofunctional acryl monomer, and a photoinitiator. Then another UV-curable resin (MH-7361 by Mitsubishi Rayon Co., Ltd.) was spin coated on the inner layer and exposed to UV radiation, forming a surface layer of 3 $\mu$m thick. This resulted in a light-transmitting layer of 100 $\mu$m thick. The surface layer and the inner layer had a pencil hardness at 25° C. of H and B, respectively.

In the formation of the surface layer, the coating solution was fed at a position outside the inner edge of the inner layer. Accordingly, the inner diameter of the surface layer was 2 mm larger than that of the inner layer. No coating inconsistency or defects were found in the visual inspection of the resulting light-transmitting layer.

Example 2

A sample of optical recording disk was produced by repeating the procedure of Example 1 except that the UV-curable resin used for the inner layer of the light-transmitting layer had a viscosity of 5000 centipoise at 25° C. and contained an epoxyacrylate oligomer, a monofunctional acryl monomer, and a photoinitiator and no polyfunctional monomer. Content of the monofunctional acryl monomer was also higher than that of the UV-curable resin used in Example 1.

In the formation of the surface layer, the coating solution was fed at a position outside the position used in Example 1. Accordingly, the inner diameter of the surface layer was 5 mm larger than that of the inner layer. No coating inconsistency or defects were found in the visual inspection of the resulting light-transmitting layer.

Example 3

A sample of optical recording disk was produced by repeating the procedure of Example 1 except that the UV-curable resin used for the inner layer of the light-transmitting layer had a viscosity of 3000 centipoise at 25° C. and contained an epoxyacrylate oligomer, a bifunctional acryl monomer, a monofunctional acryl monomer, and a photoinitiator. The UV-curable resin used in this example is different from the one used in Example 1 in that it contained a bifunctional acryl monomer instead of the polyfunctional acryl monomer.

Example 4

A sample of optical recording disk was produced by repeating the procedure of Example 1 except that the inner layer in the light-transmitting layer was formed by the procedure as described below.

On the surface of the first dielectric layer was spin coated a solution of a radical-polymerizing UV-curable resin (4×108E manufactured by Chemitex; solvent, butyl acetate) to form a resin layer. A polycarbonate sheet of 100 μm thick was then disposed on the resin layer, and the resin layer was cured by UV irradiation so that the resin layer serves as the adhesive layer.

Comparative Example 1

A sample of optical recording disk was produced by repeating the procedure of Example 2 except that the UV-curable resin used for the inner layer of the light-transmitting layer had a viscosity of 2000 centipoise at 25° C. This resin was the same as the one used in Example 2 in that it contained an epoxyacrylate oligomer, a monofunctional acryl monomer, and a photoinitiator. Content of the monofunctional acryl monomer, however, was higher than that of the resin used in Example 2.

Comparative Example 2

A sample of optical recording disk was produced by repeating the procedure of Example 2 except that the UV-curable resin used for the inner layer of the light-transmitting layer had a viscosity of 3000 centipoise at 25° C. This resin was the same as those used in Example 2 and Comparative Example 1 in that it contained an epoxyacrylate oligomer, a monofunctional acryl monomer, and a photoinitiator. Content of the monofunctional acryl monomer, however, was higher than that of the resin used in Example 2 and lower than Comparative Example 1.

Comparative Example 3

A sample of optical recording disk was produced by repeating the procedure of Example 1 except that the UV-curable resin used for the inner layer of the light-transmitting layer was SD318 manufactured by Dainippon Ink & Chemicals, Inc. having a viscosity of 140 centipoise at 25° C.

Comparative Example 4

A sample of optical recording disk was produced by repeating the procedure of Example 1 except that the UV-curable resin used for the inner layer of the light-transmitting layer was MD341 manufactured by Nippon Kayaku Co., Ltd. having a viscosity of 70 centipoise at 25° C.

Evaluation

Next, the light-transmitting layer of the samples prepared in the Examples and Comparative Examples was cut by a cutter knife to rectangular strips of 60 mm×10 mm. Using Tensilon Model TRM-100 by Orientec K. K., the test strip was measured for of tensile yield stress and tensile strain at yield under the measuring conditions prescribed in JIS K-7127 (1989). The results are shown in Tables 1 to 3. It is noted that when the test strips were cut out, the dielectric layers, recording layers and reflective layer remained stuck to the test strips, but the attachment of such layers to the test strips had no influence on the measurements of tensile yield stress and tensile strain at yield.

Storage test under high temperature and high humidity conditions

The sample was also measured for deflection and axial runout using an instrument LM1200 manufactured by Ono Sokki K. K. After the sample was held for 100 hours in an atmosphere of 80° C. and RH 80%, similar measurement was repeated. The surface layer was observed after the storage to check for the cracks. Increase in the deflection caused by the storage, the axial runout before and after the storage, and occurrence of the cracks are shown in Table 1.

TABLE 1

High temperature, high humidity storage test

| | Tensile yield stress (MPa) | Tensile strain at yield (%) | Increase in deflection (μm) | surface crack | Axial runout (μm) | |
|---|---|---|---|---|---|---|
| | | | | | Initial | After storage |
| E. 1 | 46.55 | 3.75 | 40 | 0/3 | 130.1 | 79.8 |
| E. 2 | 32.63 | 6.66 | 26 | 0/3 | 39.1 | 56.5 |
| E. 3 | 42.63 | 4.10 | 37 | 0/3 | 85.3 | 88.6 |
| E. 4 | 68.60 | 7.00 | 40 | 0/3 | 51.6 | 69.7 |
| C.E. 1 | 2.94* | 4.10 | 20 | 3/3 | 74.6 | 80.1 |
| C.E. 2 | 11.76* | 5.83 | 7 | 3/3 | 68.4 | 72.3 |
| C.E. 3 | 102.7* | 1.20 | N.A. | fractured | 80.7 | N.A. |
| C.E. 4 | 140.6* | 0.90 | N.A. | fractured | 120.3 | N.A. |

E.: Example, C.E.: Comparative Example
N.A.: Not available
*: outside the scope of the invention The data in Table 1 demonstrate the effectiveness of the invention. To be more specific, the samples wherein the tensile yield stress and the tensile strain at yield are within the scope of the present invention exhibited a reduced axial runout both before and after the storage as well as reduced increase in the deflection after the storage under the high temperature, high humidity conditions. The sample of the present invention also exhibited no cracks in the surface layer. In contrast, Comparative Examples 1 and 2 with the light-transmitting layer of excessively low tensile yield stress suffered from the cracks in the surface layer. The samples of Comparative Examples 1 and 2 were also evaluated for tensile elongation at break of the light-transmitting layer, and it was 76.3% in Comparative Example 1 and 50% in Comparative Example 2.

The resins which constitute the inner layer in Comparative Examples 3 and 4 are those which are commonly used for the protective coating of an optical disk. The light-transmitting layer, however, is by far thicker than the protective coating, and the light-transmitting layer prepared by using such resin gets fractured when the medium is stored under hot humid conditions. As noted in Table 1, increase in the deflection caused by the storage was not measurable in Comparative Examples 3 and 4 due to the fracture caused in the light-transmitting layer.

In addition to the samples as described above, a sample of optical recording disk was prepared by repeating the procedure of Example 1 except that the surface layer was a cured film of a polysilazane which was formed by spin coating a solution of a polysilazane in xylene (N-L110 manufactured by Tonen K. K. having a solid concentration in mass % of 20%), leaving the coating at room temperature for 1 minute, and heating the coating to a temperature of 100° C. for 30 minutes to thereby cure the coating. The surface layer had a thickness of 0.2 µm and a pencil hardness at 25° C. of 4 H. When the sample was evaluated as in the case of Example 1, effects found in Example 1 were also noted.

Thermal Shock Test 1

The samples were measured for deflection and axial runout using LM1200 manufactured by Ono Sokki K. K. Instead of the storage test under high temperature and high humidity conditions as described above, the samples were subjected to the thermal shock test as described above. The thermal shock test was conducted by using a thermal cycle test instrument manufactured by Kusumoto Kasei K. K. at the temperature difference of 90° C. (high temperature environments, 70° C.; low temperature environment, −20° C.), storage time of 30 minutes, and cycle number of 100. Increase in the deflection caused by the thermal shock test, the axial runout before and after the storage, and occurrence of the cracks are shown in Table 2.

Thermal shock test 2

The thermal shock test was conducted by repeating the procedure of thermal shock test 1 except that the temperature difference was 60° C. (high temperature environments, 55° C.; low temperature environment, −5° C.). Increase in the deflection caused by the thermal shock test, the axial runout before and after the storage, and occurrence of the cracks are shown in Table 3.

TABLE 2

Thermal shock test 1

| | Tensile yield stress (MPa) | Tensile strain at yield (%) | Increase in deflection (µm) | Surface crack | Axial runout (µm) Initial | After storage |
|---|---|---|---|---|---|---|
| E. 1 | 46.55 | 3.75 | 30 | 0/3 | 118.4 | 103.5 |
| E. 2 | 32.63 | 6.66 | 10 | 0/3 | 42.6 | 47.3 |
| E. 3 | 42.63 | 4.10 | 25 | 0/3 | 80.7 | 78.1 |
| E. 4 | 68.60 | 7.00 | 33 | 0/3 | 60.8 | 62.9 |
| C.E. 1 | 2.94* | 4.10 | 10 | 3/3 | 50.6 | 55.8 |
| C.E. 2 | 11.76* | 5.83 | 13 | 3/3 | 47.3 | 50.8 |
| C.E. 3 | 102.7* | 1.20 | N.A. | fractured | 138.5 | N.A. |
| C.E. 4 | 140.6* | 0.90 | N.A. | fractured | 140.8 | N.A. |

E.: Example, C.E.: Comparative Example
N.A.: Not available
*: outside the scope of the invention

TABLE 3

Thermal shock test 2

| | Tensile yield stress (MPa) | Tensile strain at yield (%) | Increase in deflection (µm) | surface crack | Axial runout (µm) Initial | After storage |
|---|---|---|---|---|---|---|
| E. 1 | 46.55 | 3.75 | 25 | 0/3 | 123.7 | 128.5 |
| E. 2 | 32.63 | 6.66 | −5 | 0/3 | 47.6 | 45.3 |
| E. 3 | 42.63 | 4.10 | 17 | 0/3 | 67.3 | 58.9 |
| E. 4 | 68.60 | 7.00 | 28 | 0/3 | 89.7 | 93.6 |
| C.E. 1 | 2.94* | 4.10 | −5 | 0/3 | 45.8 | 47.3 |
| C.E. 2 | 11.76* | 5.83 | 5 | 0/3 | 60.3 | 55.2 |
| C.E. 3 | 102.7* | 1.20 | 235 | 0/3 | 145.5 | 237.2 |
| C.E. 4 | 140.6* | 0.90 | 389 | 0/3 | 163.8 | 286.9 |

E.: Example, C.E.: Comparative Example
*: outside the scope of the invention

As seen in Table 2, the results were significantly different between the Examples of the present invention and the Comparative Examples since thermal cycles at a temperature difference of more than 70° C. were repeated for more than 30 cycles in the thermal shock test 1. In contrast, the results are rather equivalent in Table 3 between the Examples of the present invention and the Comparative Examples since the temperature difference of the thermal cycles used in the thermal shock test 2 was less than 70° C. The results demonstrate the effectiveness of the test method of the present invention.

It is to be noted that the value indicated for the axial runout before the storage is slightly different in each of Tables 1 to 3 even for the same Examples and the same Comparative Examples. Such difference in the value was caused by the unavailability of using the same sample for the different storage tests.

Comparative Example 5

A sample of optical recording disk was produced by repeating the procedure of Example 1 except that the coating solution was fed at a position inside the inner edge of the inner layer position used in Example 1. Accordingly, the inner diameter of the surface layer was 2 mm smaller than that of the inner layer. Visual inspection of the resulting light-transmitting layer demonstrated many coating inconsistency stretching from the inside to outside of the disk.

Japanese Patent Application Nos. 2000-269242 and 2001-046778 are incorporated herein by reference.

Although some preferred embodiments have been described, many modifications and variations may be made thereto in the light of the above teachings. It is therefore to be understood that within the scope of the appended claims, the invention may be practiced otherwise than as specifically described.

What is claimed is:

1. An optical information medium comprising a supporting substrate, an information recording layer thereon, and a light-transmitting layer on the information recording layer, wherein a recording or reading laser beam enters the medium through the light-transmitting layer, wherein said light-transmitting layer includes at least one resin layer, and said light-transmitting layer has a tensile yield stress of 20 to 100 MPa, a tensile strain at yield of 0.1 to 15% and a thickness of more than 50 µm to 200 µm.

2. An optical information medium according to claim 1 wherein said light-transmitting layer comprises at least one resin-containing inner layer and one surface layer which is harder than the inner layer by at least 1 unit in pencil hardness, and said surface layer constitutes a surface of the medium.

3. An optical information medium according to claim 2 wherein said inner layer comprises a resin sheet or a coating of a resin containing a radiation-curable resin.

4. An optical information medium according to claim 1 wherein said light-transmitting layer includes at least two annular resin layer and at least one of said resin layer is a resin coating, and said resin coating has an inner diameter larger than that of its adjacent resin layer on the side of the supporting substrate.

5. A method for testing storage stability by a thermal shock test of the optical information medium of claim 1, wherein the method comprises the steps of
exposing the optical information medium to at least thirty cycles each comprising a high temperature environment and a low temperature environment with the temperature difference of at least 70° C., and thereafter inspecting mechanical precision of the optical information medium and cracks and peeling of said resin layer.

* * * * *